US012725833B2

(12) United States Patent
Lee et al.

(10) Patent No.: US 12,725,833 B2
(45) Date of Patent: Sep. 1, 2026

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Jung Min Lee, Daejeon (KR); Young Min Lim, Daejeon (KR); Chul Haeng Lee, Daejeon (KR); Yi Jin Jung, Daejeon (KR); Chul Eun Yeom, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 624 days.

(21) Appl. No.: 17/770,316

(22) PCT Filed: Feb. 18, 2021

(86) PCT No.: PCT/KR2021/002054

§ 371 (c)(1),
(2) Date: Apr. 20, 2022

(87) PCT Pub. No.: WO2021/167360

PCT Pub. Date: Aug. 26, 2021

(65) Prior Publication Data

US 2022/0399573 A1 Dec. 15, 2022

(30) Foreign Application Priority Data

Feb. 21, 2020 (KR) ........................ 10-2020-0021730
Feb. 17, 2021 (KR) ........................ 10-2021-0020837

(51) Int. Cl.

*H01M 10/0568* (2010.01)
*H01M 10/0525* (2010.01)
*H01M 10/0567* (2010.01)
*H01M 10/0569* (2010.01)
*H01M 50/46* (2021.01)

(52) U.S. Cl.

CPC ... *H01M 10/0568* (2013.01); *H01M 10/0525* (2013.01); *H01M 10/0567* (2013.01); *H01M 10/0569* (2013.01); *H01M 50/46* (2021.01); *H01M 2300/0037* (2013.01)

(58) Field of Classification Search

None
See application file for complete search history.

(56) References Cited

U.S. PATENT DOCUMENTS

| | | | | |
|---|---|---|---|---|
| 7,083,878 | B2 | 8/2006 | Kotato et al. | |
| 2005/0164094 | A1 | 7/2005 | Kotato et al. | |
| 2008/0020287 | A1 * | 1/2008 | Cho | |
| 2011/0111305 | A1 | 5/2011 | Jeon et al. | |
| 2011/0171502 | A1 | 7/2011 | Kottenstette et al. | |
| 2012/0196190 | A1 * | 8/2012 | Jeon | H01M 10/0525 |
| 2012/0196191 | A1 | 8/2012 | Jeon et al. | |
| 2013/0164604 | A1 * | 6/2013 | Matsumoto | H01M 4/622 429/188 |
| 2013/0189572 | A1 | 7/2013 | Han | |
| 2014/0205913 | A1 | 7/2014 | Park et al. | |
| 2015/0333372 | A1 | 11/2015 | Cho et al. | |
| 2016/0028116 | A1 | 1/2016 | Ahn et al. | |
| 2020/0212490 | A1 * | 7/2020 | Coleman | |
| 2021/0043977 | A1 | 2/2021 | Jang et al. | |

FOREIGN PATENT DOCUMENTS

| | | | | |
|---|---|---|---|---|
| CN | 101779325 | A | 7/2010 | |
| CN | 106159330 | A | 11/2016 | |
| CN | 106471662 | A * | 3/2017 | H01G 11/06 |
| CN | 107017432 | B | 2/2019 | |
| CN | 109461967 | A | 3/2019 | |
| JP | H07176322 | A | 7/1995 | |
| JP | 2019185859 | A | 10/2019 | |
| KR | 20080004928 | A | 1/2008 | |
| KR | 20120123380 | A | 11/2012 | |
| KR | 20130085256 | A | 7/2013 | |
| KR | 20140094959 | A | 7/2014 | |
| KR | 20150131509 | A | 11/2015 | |
| KR | 20160006096 | A | 1/2016 | |
| KR | 20190054920 | A | 5/2019 | |
| KR | 20190106219 | A | 9/2019 | |
| KR | 20200039586 | A * | 4/2020 | |

OTHER PUBLICATIONS

A. Ohta et al: "Relationship between carbonaceous materials and electrolyte in secondary lithium-ion batteries", Journal of Power Sources, vol. 54, No. 1, Mar. 1, 1995 (Mar. 1, 1995), pp. 6-10, XP005295632.

Extended European Search Report for Application No. 21757875.6 dated Mar. 20, 2023. 10 pgs.

International Search Report for PCT/KR2021/002054 dated Jun. 9, 2021. 3 pgs.

* cited by examiner

*Primary Examiner* — Nicole M. Buie-Hatcher
*Assistant Examiner* — Krishna R Hammond
(74) *Attorney, Agent, or Firm* — Lerner David LLP

(57) ABSTRACT

A non-aqueous electrolyte solution for a lithium secondary battery and a lithium secondary battery including the same are disclosed herein. In some embodiments, a non-aqueous electrolyte solution includes a lithium salt at a concentration of 1.5 M to 2.0 M, an organic solvent containing ethylene carbonate and ethyl propionate, and a first additive represented by Formula 1, wherein the ethylene carbonate and the ethyl propionate are present in a volume ratio of 1:9 to 1.5:8.5:

$$NC—R—CH{=}CH—R_1—CN \quad \text{[Formula 1]}$$

In Formula 1, R and $R_1$ are each independently a substituted or unsubstituted alkylene group having 1 to 5 carbon atoms.

5 Claims, No Drawings

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2021/002054, filed on Feb. 18, 2021, which claims priority from Korean Patent Application Nos. 10-2020-0021730, filed on Feb. 21, 2020, and 10-2021-0020837, filed on Feb. 17, 2021, the disclosures of which are incorporated by reference herein.

TECHNICAL FIELD

The present invention relates to a non-aqueous electrolyte solution for a lithium secondary battery and a lithium secondary battery including the same, and to a non-aqueous electrolyte solution for a lithium secondary battery which may suppress gas generation during high-voltage operation and a lithium secondary battery in which high-temperature storage characteristics are improved by including the same.

BACKGROUND ART

Demand for secondary batteries as an energy source has been significantly increased as technology development and demand with respect to mobile devices have increased, and, among these secondary batteries, lithium secondary batteries having high energy density and high voltage have been commercialized and widely used.

A lithium secondary battery is prepared by a process in which, after a current collector is coated with an electrode active material of appropriate thickness or the electrode active material itself is formed in the form of a film having an appropriate length, the resultant product is wound or stacked with an insulating separator to prepare an electrode assembly, the electrode assembly is accommodated in a can or a container similar thereto, and a non-aqueous electrolyte solution is then injected thereinto.

Charge and discharge of the lithium secondary battery is performed while a process of intercalating and deintercalating lithium ions from a lithium metal oxide positive electrode into and out of a graphite negative electrode is repeated. In this case, since lithium is highly reactive, lithium reacts with the carbon electrode to form $Li_2CO_3$, LiO, or LiOH, and thus, a film is formed on a surface of the negative electrode.

The film is denoted as "solid electrolyte interface (SEI)", wherein the SEI formed at an initial stage of charging plays a role in preventing the collapse of a structure of the carbon negative electrode by preventing a reaction of the lithium ions with the carbon negative electrode during charge and discharge.

Thus, in order to improve high-temperature storage characteristics and cycle life characteristics of the lithium secondary battery, there is necessarily a need to develop a technology capable of forming a robust SEI film on the negative electrode of the lithium secondary battery.

Recently, a need for design of a non-aqueous electrolyte solution effective during fast charging has emerged as the demand for fast charging and discharging of secondary batteries has increased.

With respect to non-aqueous electrolyte solutions currently used, cell swelling occurs due to gas generation during rapid charging at a rate of 2 C or higher, or the high-temperature storage characteristics of the secondary battery are degraded while lithium is precipitated from the negative electrode due to the inability to be effectively charged.

Therefore, there is a need to develop a non-aqueous electrolyte solution which may not only be rapidly charged, but may also suppress gas generation during high-voltage operation.

DISCLOSURE OF THE INVENTION

Technical Problem

An aspect of the present invention provides a non-aqueous electrolyte solution which may not only be rapidly charged, but may also suppress gas generation during high-voltage operation.

Another aspect of the present invention provides a lithium secondary battery in which high-temperature storage characteristics are improved by including the non-aqueous electrolyte solution.

Technical Solution

According to an aspect of the present invention, there is provided a non-aqueous electrolyte solution including:

a lithium salt at a concentration of 1.5 M to 2.0 M, an organic solvent containing ethylene carbonate and ethyl propionate, and a nitrile-based compound represented by Formula 1 as a first additive, wherein the ethylene carbonate and the ethyl propionate are included in a volume ratio of 1:9 to 1.5:8.5.

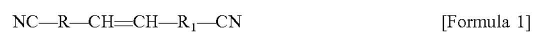

$$NC—R—CH{=}CH—R_1—CN \quad \text{[Formula 1]}$$

In Formula 1,

R and $R_1$ are each independently a substituted or unsubstituted alkylene group having 1 to 5 carbon atoms.

According to another aspect of the present invention, there is provided a lithium secondary battery including the non-aqueous electrolyte solution of the present invention.

Advantageous Effects

Since a non-aqueous electrolyte solution of the present invention includes a lithium salt having a specific concentration and simultaneously reduces an amount of ethylene carbonate having high viscosity to control viscosity of the non-aqueous electrolyte solution to an appropriate level, it may increase a rapid charging effect by improving ionic conductivity and mobility of lithium ions. In addition, since the amount of the ethylene carbonate, which is vulnerable and easily decomposed at high voltage, is reduced, gas generation may be suppressed during high-voltage and high-temperature operation.

Also, since the non-aqueous electrolyte solution of the present invention includes a nitrile-based compound capable of forming a stable film on a surface of a positive electrode active material as a first additive, it may effectively suppress the gas generation by preventing a side reaction between a positive electrode and the non-aqueous electrolyte solution during high-voltage operation.

Accordingly, if the non-aqueous electrolyte solution of the present invention is used, rapid charging is not only possible, but a cell swelling phenomenon is also significantly reduced even during high-voltage operation, and thus, a lithium secondary battery having improved high-temperature storage characteristics and capacity characteristics may be achieved.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms “include,” “comprise,” or “have” in this specification specify the presence of stated features, numbers, steps, elements, or combinations thereof, but do not preclude the presence or addition of one or more other features, numbers, steps, elements, or combinations thereof.

In the present specification, the expression “%” denotes wt % unless explicitly stated otherwise.

Before describing the present invention, the expressions “a” and “b” in the description of “a to b carbon atoms” in the specification each denote the number of carbon atoms included in a specific functional group. That is, the functional group may include “a” to “b” carbon atoms. For example, the expression “alkylene group having 1 to 5 carbon atoms” denotes an alkylene group including 1 to 5 carbon atoms, that is, $—CH_2—$, $—CH_2CH_2—$, $—CH_2CH_2CH_2—$, $—CH_2(CH_3)CH—$, $—CH(CH_3)CH_2—$, and $—CH(CH_3)CH_2CH_2—$.

In this case, the expression “alkylene group” denotes a branched or unbranched divalent unsaturated hydrocarbon group. In an embodiment, the alkylene group may be substituted or unsubstituted. The alkylene group includes a methylene group, an ethylene group, a propylene group, an isopropylene group, a butylene group, an isobutylene group, a tert-butylene group, a pentylene group, and 3-pentylene group, but the alkylene group is not limited thereto, and each thereof may be optionally substituted in another exemplary embodiment.

Also, unless otherwise defined in the specification, the expression “substitution” denotes that at least one hydrogen bonded to carbon is substituted with an alkyl group having 1 to 5 carbon atoms or a fluorine element.

The present inventors found that, in a case in which a non-aqueous electrolyte solution including a lithium salt having a specific concentration and an organic solvent capable of improving mobility of lithium ions together is used, rapid charging characteristics may be satisfied even under high-voltage conditions, thereby leading to the completion of the present invention.

Non-Aqueous Electrolyte Solution

Specifically, a non-aqueous electrolyte solution of the present invention includes:

- a lithium salt at a concentration of 1.5 M to 2.0 M,
- an organic solvent containing ethylene carbonate and ethyl propionate, and
- a nitrile-based compound represented by Formula 1 as a first additive,
- wherein the ethylene carbonate and the ethyl propionate are included in a volume ratio of 1:9 to 1.5:8.5.

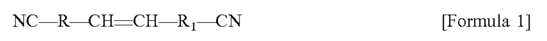

$NC—R—CH{=}CH—R_1—CN$ [Formula 1]

In Formula 1,

R and $R_1$ are each independently a substituted or unsubstituted alkylene group having 1 to 5 carbon atoms.

(1) Lithium Salt

The lithium salt is a lithium salt used in a common non-aqueous electrolyte solution, wherein, specifically, the Lithium salt may include $Li^+$ as a cation, and may include one selected from the group consisting of $F^-$, $Cl^-$, $Br^-$, $I^-$, $NO_3^-$, $N(CN)_2^-$, $ClO_4^-$, $BF_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion, and, in addition to them, any lithium salt commonly used in a non-aqueous electrolyte solution of a lithium secondary battery may be used without limitation.

Specifically, the lithium salt may include a single material selected from the group consisting of $LiC_1$, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, LiFSI (lithium bis(fluorosulfonyl)imide, $LiN(SO_2F)_2$). LiBETI (lithium bis(perfluoroethanesulfonyl)imide, $LiN(SO_2CF_2CF_3)_2$), and LiTFSI (lithium bis(trifluoromethanesulfonyl)imide, $LiN(SO_2CF_3)_2$), or a mixture of two or more thereof, and, more specifically, the lithium salt may include at least one selected from the group consisting of $LiPF_6$, $Li(CF_3SO_2)_2N$, $Li(FSO_2)_2N$, and $Li(CF_3CF_2SO_2)_2N$.

The lithium salt may be appropriately changed in a normally usable range, but may be included in a concentration of 1.5 M to 2.0 M, for example, 1.5 M to 1.8 M to improve mobility of lithium ions and improve an effect of forming a film for preventing corrosion of a surface of an electrode.

In a case in which the concentration of the lithium salt satisfies the above range, high lithium cation ($Li^+$) transfer characteristics (that is, cation transference number) may be secured due to an increase in lithium cations present in the non-aqueous electrolyte solution, and an effect of reducing diffusion resistance of lithium ions may be achieved to obtain an effect of improving cycle capacity characteristics.

Particularly, if the lithium salt is included in a concentration of 1.5 M or more, resistance due to Li-ion depletion during high-rate charge and discharge may be reduced, and, in a case in which the concentration of the lithium salt is 2.0 M or less, an increase in viscosity of the non-aqueous electrolyte solution may be prevented while securing moving speed of the lithium ions. In a case in which the concentration of the lithium salt is greater than 2.0 M, non-aqueous electrolyte solution impregnability may be reduced due to an excessive increase in the viscosity of the non-aqueous electrolyte solution.

(2) Organic Solvent

Ethylene carbonate and ethyl propionate may be included as the organic solvent.

The ethylene carbonate is a solvent having a high dielectric constant, wherein it is advantageous in that it may improve output characteristics by increasing ionic conductivity of a non-aqueous electrolyte solution when used in the non-aqueous electrolyte solution. However, with respect to the ethylene carbonate, since it is easily decomposed due to high viscosity and high reactivity at high voltage, gas generation is increased during charge, and thus, cell swelling may be increased and high-temperature storage stability may be reduced.

In order to improve such a disadvantage in the present invention, the gas generation may be suppressed and a resulting cell swelling phenomenon may be improved by mixing ethyl propionate having relatively high stability at high temperature and high voltage together, instead of reducing an amount of the ethylene carbonate.

Specifically, the ethylene carbonate and the ethyl propionate may be mixed in a volume ratio of 1:9 to 1.5:8.5, for example, 1:9 to 1.4:8.6.

In a case in which the volume ratio of the ethylene carbonate to the ethyl propionate satisfies the above range, a synergistic effect due to the mixed use of the two organic solvents may be achieved. If the volume ratio of the ethylene carbonate to the ethyl propionate is greater than 1.5, non-aqueous electrolyte solution wetting may not only be reduced due to the increase in the viscosity of the non-aqueous electrolyte solution, but the gas generation due to an oxidation reaction during high-voltage and rapid charging may be increased to decrease cell stability at high voltage and a cell swelling inhibition effect. Also, if the volume ratio of the ethylene carbonate is less than 1, safety of the cell may be reduced because a stable passivation solid electrolyte interface (SEI) is difficult to be formed.

That is, the non-aqueous electrolyte solution of the present invention may secure low viscosity and high ionic conductivity by including the ethyl propionate in a volume ratio of 8.5 or more. Thus, the increase in the viscosity of the non-aqueous electrolyte solution due to an increase in the concentration of the lithium salt may be prevented, and resulting problems of decreasing the ionic conductivity and the wetting of the non-aqueous electrolyte solution may be compensated.

(3) First Additive

The non-aqueous electrolyte solution of the present invention includes a nitrile-based compound represented by the following Formula 1 as a first additive.

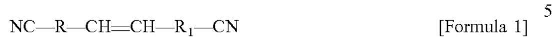

$NC—R—CH{=}CH—R_1—CN$ [Formula 1]

In Formula 1,

R and $R_1$ are each independently a substituted or unsubstituted alkylene group having 1 to 5 carbon atoms.

In Formula 1, R and $R_1$ are each independently a substituted or unsubstituted alkylene group having 1 to 3 carbon atoms, for example, a substituted or unsubstituted alkylene group having 1 or 2 carbon atoms. Specifically, the nitrile-based compound represented by Formula 1 may be 1,4-dicyanobutene (DCB or trans-3-hexenedinitrile) in which R and $R_1$ are alkylene groups having 1 carbon atom in Formula 1.

The nitrile-based compound represented by Formula 1 may be included in an amount of 0.1 wt % to 5 wt %, particularly 0.5 wt % to 4 wt %, and more particularly 0.5 wt % to 3 wt % based on a total weight of the non-aqueous electrolyte solution.

In a case in which the amount of the nitrile-based compound represented by Formula 1 satisfies the above range, a gas generation suppression effect and a resulting cell swelling suppression effect may be achieved. If the amount of the nitrile-based compound represented by Formula 1 is greater than 5 wt %, since the viscosity of the non-aqueous electrolyte solution is increased by the excessive amount of the additive compound, an increase in resistance and a side reaction may occur to reduce capacity of the secondary battery. If the amount of the nitrile-based compound represented by Formula 1 is less than 0.1 wt %, the gas generation suppression effect to be described later may be insignificant.

The nitrile-based compound represented by Formula 1 is a compound having high binding affinity with a transition metal, such as cobalt (Co), by containing two or more polar nitrile groups, wherein electrodeposition or precipitation of metal ions on a surface of a negative electrode may be prevented while forming a complex with metallic foreign matters incorporated from raw materials or during a preparation process as well as the transition metal ions dissolved from a positive electrode during high-temperature storage. Also, since the nitrile-based compound represented by Formula 1 may effectively suppress the gas generation due to the side reaction between the positive electrode and the non-aqueous electrolyte solution during high-voltage operation by forming a stable film on a surface of the positive electrode, it may reduce the cell swelling phenomenon. In addition, in addition to the metal ion adsorption, since an unshared electron pair of nitrogen (N) of the nitrile group in the compound represented by Formula 1 stabilizes the anion of the lithium salt to suppress generation of HF due to the decomposition of the lithium salt, the compound represented by Formula 1 may further improve high-temperature storage characteristics of the secondary battery.

Since the nitrile-based compound containing at least one double bond in its structure, such as the compound represented by Formula 1, has an electron cloud rich in double bonds in comparison to a compound that does not contain a double bond, such as adiponitrile, a bond with the metal ions becomes stronger, and thus, it may further improve the high-temperature storage characteristics by forming a more stable film on the positive electrode and removing the transition metal dissolved from the positive electrode at the same time.

(4) Second Additive

In order to further improve low-temperature high-rate discharge characteristics, high-temperature stability, overcharge protection, and an effect of improving swelling during high-temperature storage, the non-aqueous electrolyte solution for a lithium secondary battery of the present invention may additionally further include a second additive capable of forming a more stable ion conductivity film on the surface of the electrode, if necessary.

Specifically, as a representative example, the second additive may include at least one additive selected from the group consisting of a phosphate-based compound, a sulfite-based compound, a sulfone-based compound, a sulfate-based compound, a sultone-based compound, a halogen-substituted carbonate-based compound, a cyclic carbonate-based compound, a nitrile-based compound excluding the compound of Formula 1, a borate-based compound, and a lithium salt-based compound.

The phosphate-based compound is a component for assisting the formation of the SEI by being electrochemically decomposed on the surfaces of the positive electrode and the negative electrode, wherein an effect of improving long-term cycle life characteristics of the secondary battery may be achieved by the phosphate-based compound. As a representative example, the phosphate-based compound may include at least one compound selected from the group consisting of lithium difluoro(bisoxalato)phosphate, lithium difluorophosphate, tris(trimethylsilyl)phosphate (TMSPa), tris(trimethylsilyl)phosphite (TMSPi), tris(2,2,2-trifluoroethyl)phosphate (TFEPa), and tris(trifluoroethyl)phosphite (TFEPi), and may specifically include lithium difluorophosphate.

The phosphate-based compound may be included in an amount of 0.5 wt % to 10 wt % or less based on the total weight of the non-aqueous electrolyte solution. If the amount of the phosphate-based compound is greater than 10 wt %, since internal resistance of the battery is increased due to the excessive use of the additive, cycle life characteristics are degraded, and, if the amount of the phosphate-based compound is less than 0.5 wt %, since a stabilization effect during the formation of the SEI is insignificant, the high-temperature storage characteristics and the cycle life characteristics may be degraded.

The sulfite-based compound may include at least one compound selected from the group consisting of ethylene sulfate, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, and 1,3-butylene glycol sulfite, and may be included in an amount of 3 wt % or less based on the total weight of the non-aqueous electrolyte solution.

The sulfone-based compound may include at least one compound selected from the group consisting of divinyl sulfone, dimethyl sulfone, diethyl sulfone, methylethyl sulfone, and methylvinyl sulfone, and may be included in an amount of 3 wt % or less based on the total weight of the non-aqueous electrolyte solution.

The sulfate-based compound may include ethylene sulfate (ES), trimethylene sulfate (TMS), or methyl trimethylene sulfate (MTMS), and may be included in an amount of 3 wt % or less based on the total weight of the non-aqueous electrolyte solution.

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone, and may be included in an amount of 0.3 wt % to 5 wt %, for example, 1 wt % to 5 wt % based on the total weight of the non-aqueous electrolyte solution. In a case in which the amount of the sultone-based compound in the non-aqueous electrolyte solution is greater than 5 wt %, an excessively thick film may be formed on the surface of the electrode to cause an increase in resistance and a degradation of output, and resistance due to the excessive amount of the additive in the non-aqueous electrolyte solution may be increased to degrade output characteristics.

The halogen-substituted carbonate-based compound may include fluoroethylene carbonate (FEC), and may be included in an amount of 5 wt % or less based on the total weight of the non-aqueous electrolyte solution. In a case in which the amount of the halogen-substituted carbonate-based compound in the non-aqueous electrolyte solution is greater than 5 wt %, cell swelling inhibition performance may be degraded.

The cyclic carbonate-based compound may include vinylene carbonate (VC) or vinyl ethylene carbonate (VEC), and may be included in an amount of 3 wt % or less based on the total weight of the non-aqueous electrolyte solution. In a case in which the amount of the cyclic carbonate-based compound in the non-aqueous electrolyte solution is greater than 3 wt %, the cell swelling inhibition performance may be degraded.

Also, the nitrile-based compound may include at least one compound selected from the group consisting of succinonitrile (SN), adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, hexane tri-cyanide (HTCN), and 1,4-dicyano-2-butene (DCB), excluding the compound represented by Formula 1.

The borate-based compound may include lithium oxalyldifluoroborate (LiODFB) or lithium bis(oxalato)borate ($LiB(C_2O_4)_2$; LiBOB), and may be included in an amount of 3 wt % or less based on the total weight of the non-aqueous electrolyte solution.

The lithium salt-based compound is a compound different from the lithium salt included in the non-aqueous electrolyte solution, wherein the lithium salt-based compound may include $LiPO_2F_2$ or $LiBF_4$, and may be included in an amount of 3 wt % or less based on the total weight of the non-aqueous electrolyte solution.

More specifically, the second additive may include at least one selected from vinylene carbonate, vinylethylene carbonate, 1,3-propane sultone, fluoroethylene carbonate, hexane tri-cyanide, and lithium oxalyldifluoroborate.

Two or more of the second additives may be mixed and included.

The first and second additives may be included in an amount of 10 wt % or less, for example, 6 wt % or less based on the total weight of the non-aqueous electrolyte solution. An effect of suppressing the dissolution of the transition metal from the positive electrode may be improved as the total amount of the first and second additives increases, but resistance increases as an excessively thick film is formed on the positive/negative electrode, and there is a possibility that a side reaction in the non-aqueous electrolyte solution excessively occurs during charge and discharge of the battery. Particularly, when the excessive amount of the first and second additives is added, the first and second additives may not be sufficiently decomposed at high temperatures so that they may be present in the form of an unreacted material or precipitates in the non-aqueous electrolyte solution at room temperature. Accordingly, a side reaction that degrades cycle life or capacity characteristics of the secondary battery may occur.

Lithium Secondary Battery

Also, in the present invention, a lithium secondary battery including the above-described non-aqueous electrolyte solution may be provided.

The lithium secondary battery includes a positive electrode including a positive electrode active material, a negative electrode including a negative electrode active material, a separator disposed between the positive electrode and the negative electrode, and the above-described non-aqueous electrolyte solution.

Specifically, the lithium secondary battery of the present invention may be prepared by injecting the non-aqueous electrolyte solution of the present invention into an electrode assembly formed by sequentially stacking the positive electrode, the negative electrode, and the separator optionally disposed between the positive electrode and the negative electrode. In this case, any positive electrode, negative electrode, and separator, which have typically been used in the preparation of a lithium secondary battery, may be used as the positive electrode, negative electrode, and separator which constitute the electrode assembly.

The positive electrode and the negative electrode, which constitute the lithium secondary battery of the present invention, may be prepared by a conventional method and used.

(1) Positive Electrode

The positive electrode may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has high conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. More specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-y}Mn_yO_2$ (where 0<Y<1), $LiMn_{2-z}Ni_zO_4$ (where 0<Z<2), etc.), lithium-nickel-cobalt-based oxide (e.g., $LiNi_{1-y1}Co_{Y1}O_2$ (where 0<Y1<1), etc.), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), lithium-nickel-manganese-cobalt-based oxide (e.g., $Li(Ni_pCo_qMn_{r1})O_2$ (where 0<p<1, 0<q<1, 0<r1<1, and p+q+r1=1) or $Li(Ni_p1Co_{g1}Mn_{r2})O_4$ (where 0<p1<2, 0<q1<2, 0<r2<2, and p1+q1+r2=2), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide such as $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.1})O_2$, and $Li(Ni_{0.8}Mn_{0.1}Co_{0.1})O_2$, or lithium nickel cobalt aluminum oxide such as $Li(Ni_{0.8}Co_{0.15}Al_{0.05})O_2$.

The positive electrode active material may be included in an amount of 80 wt % to 99.5 wt %, for example, 85 wt % to 95 wt % based on a total weight of solid content in the positive electrode slurry. In a case in which the amount of the positive electrode active material is 80 wt % or less, since energy density is decreased, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. If the amount of the binder is less than 1 wt %, adhesion between the electrode active material and the current collector may be insufficient, and, if the amount of the binder is greater than 30 wt %, the adhesion may be improved, but the amount of the positive electrode active material is reduced to such an extent that battery capacity may be reduced.

Examples of the binder may be a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

Furthermore, the conductive agent may be added in an amount of 1 wt % to 20 wt % based on the total weight of the solid content in the positive electrode slurry.

The conductive agent is not particularly limited as long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

As the solvent, NMP (N-methyl-2-pyrrolidone), dimethyl sulfoxide (DMSO), isopropyl alcohol, N-methylpyrrolidone (NMP), acetone, or water may be used alone or a mixture thereof may be used. An amount of the solvent used may be appropriately adjusted in consideration of a coating thickness, production yield, and viscosity, and, for example, the solvent may be included in an amount such that a concentration of the solid content in the positive electrode slurry including the positive electrode active material as well as optionally the binder and the conductive agent is in a range of 10 wt % to 70 wt, for example, 20 wt % to 60 wt %.

(2) Negative Electrode

Also, the negative electrode may be prepared by forming a negative electrode material mixture layer on a negative electrode collector. The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me':Al, boron (B), phosphorus (P), Si, Groups I, II and III elements of the periodic table, or halogen; $0<x\leq 1$; $1\leq y\leq 3$; $1\leq z\leq 8$) may be used as the metal composite oxide.

The material, which may be doped and undoped with lithium, may include Si, $SiO_x$ ($0<x\leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry.

A binder, which is the same or different from one used in the positive electrode, may be used as the binder, and, as a representative example, the binder may include a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content including the negative electrode active material as well as optionally the binder and the conductive agent is in a range of 50 wt % to 75 wt, for example, 50 wt % to 65 wt %.

(3) Separator

Also, the separator plays a role in blocking an internal short circuit between both electrodes and impregnating the non-aqueous electrolyte solution, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

An electrolyte solution (A-1) was prepared by mixing ethylene carbonate and ethyl propionate in a volume ratio of 1:9 and then dissolving $LiPF_6$ such that a concentration of the $LiPF_6$ was 1.6 M. A non-aqueous electrolyte solution (B-1) of the present invention was prepared by adding 1 g of 1,4-dicyanobutene and 2 g of vinylene carbonate, as an additive, to 97 g of the electrolyte solution (A-1).

(Electrode Assembly Preparation)

A positive electrode active material ($LiCoO_2$), a conductive agent (carbon black), and a binder (polyvinylidene fluoride; PVDF) were added to N-methyl-2-pyrrolidone (NMP), as a solvent, in a weight ratio of 94:3:3 to prepare a positive electrode slurry. An about 20 μm thick aluminum (Al) thin film, as a positive electrode collector, was coated with the positive electrode slurry, dried, and then roll-pressed to prepare a positive electrode.

A negative electrode active material (graphite), a conductive agent (carbon black), and a binder (polyvinylidene fluoride; PVDF) were added to NMP, as a solvent, in a weight ratio of 96:1:3 to prepare a negative electrode slurry. A 10 μm thick copper (Cu) thin film, as a negative electrode collector, was coated with the negative electrode slurry, dried, and then roll-pressed to prepare a negative electrode.

An electrode assembly was prepared by sequentially stacking the positive electrode, the negative electrode, and a porous separator formed of three layers of polypropylene/polyethylene/polypropylene (PP/PE/PP).

(Secondary Battery Preparation)

After the assembled electrode assembly was accommodated in a battery case and the above-prepared non-aqueous electrolyte solution (B-1) was injected, the battery case was stored at room temperature for 3 days and was subjected to a formation process in which charging was performed at 0.2 C rate under a constant current charging condition at 60° C. to a state of charge (SOC) of 17% while applying a pressure of 0.5 $kgf/cm^2$ per area and, in a step process, charging was then performed at 0.7 C rate under a constant current charging condition at the same temperature to a SOC of 65% at a pressure of 5 $kgf/cm^2$ per area. Subsequently, after being left standing at room temperature for 2 days, degassing and hot-pressing processes were performed to prepare a 4.45 V high-voltage pouch type lithium secondary battery.

Example 2

A non-aqueous electrolyte solution (B-2) of the present invention was prepared by adding 3 g of 1,4-dicyanobutene and 2 g of vinylene carbonate to 95 g of the electrolyte solution (A-1).

Subsequently, a pouch type lithium secondary battery was prepared in the same manner as in Example 1 except injecting the non-aqueous electrolyte solution (B-2) instead of the non-aqueous electrolyte solution (B-1) of Example 1.

Example 3

A non-aqueous electrolyte solution (B-3) of the present invention was prepared by adding 0.5 g of 1,4-dicyanobutene and 2 g of vinylene carbonate to 97.5 g of the electrolyte solution (A-1).

Subsequently, a pouch type lithium secondary battery was prepared in the same manner as in Example 1 except injecting the non-aqueous electrolyte solution (B-3) instead of the non-aqueous electrolyte solution (B-1) of Example 1.

Example 4

(Non-Aqueous Electrolyte Solution Preparation)

An electrolyte solution (A-2) was prepared by mixing ethylene carbonate and ethyl propionate in a volume ratio of 1.5:8.5 and then dissolving $LiPF_6$ such that a concentration of the $LiPF_6$ was 1.6 M. A non-aqueous electrolyte solution (B-4) of the present invention was prepared by adding 1 g of 1,4-dicyanobutene and 2 g of vinylene carbonate, as an additive, to 97 g of the electrolyte solution (A-2).

Subsequently, a pouch type lithium secondary battery was prepared in the same manner as in Example 1 except injecting the non-aqueous electrolyte solution (B-4) instead of the non-aqueous electrolyte solution (B-1) of Example 1.

Example 5

A non-aqueous electrolyte solution (B-5) of the present invention was prepared by adding 5 g of 1,4-dicyanobutene and 2 g of vinylene carbonate to 93 g of the electrolyte solution (A-1).

Subsequently, a pouch type lithium secondary battery was prepared in the same manner as in Example 1 except injecting the non-aqueous electrolyte solution (B-5) instead of the non-aqueous electrolyte solution (B-1) of Example 1.

Example 6

A non-aqueous electrolyte solution (B-6) of the present invention was prepared by adding 6 g of 1,4-dicyanobutene and 2 g of vinylene carbonate to 92 g of the electrolyte solution (A-1).

Subsequently, a pouch type lithium secondary battery was prepared in the same manner as in Example 1 except injecting the non-aqueous electrolyte solution (B-6) instead of the non-aqueous electrolyte solution (B-1) of Example 1.

Comparative Example 1

1,4-dicyanobutene was not included, and 2 g of vinylene carbonate was added to 98 g of the non-aqueous electrolyte solution (A-1) to prepare a non-aqueous electrolyte solution (C-1).

Subsequently, a pouch type lithium secondary battery was prepared in the same manner as in Example 1 except inejcting the non-aqueous electrolyte solution (C-1) instead of the non-aqueous electrolyte solution (B-1) of Example 1.

Comparative Example 2

An electrolyte solution (A-3) was prepared by mixing ethylene carbonate and ethyl propionate in a volume ratio of 1:9 and then dissolving $LiPF_6$ such that a concentration of the $LiPF_6$ was 1.0 M. A non-aqueous electrolyte solution (C-2) was prepared by adding 1 g of 1,4-dicyanobutene and 2 g of vinylene carbonate, as an additive, to 97 g of the electrolyte solution (A-3).

Then, a pouch type lithium secondary battery was prepared in the same manner as in Comparative Example 1 except injecting the non-aqueous electrolyte solution (C-2) instead of the non-aqueous electrolyte solution (C-1) of Comparative Example 1.

Comparative Example 3

An electrolyte solution (A-4) was prepared by mixing ethylene carbonate and propyl propionate in a volume ratio of 1:9 and then dissolving $LiPF_6$ such that a concentration of the $LiPF_6$ was 1.6 M. A non-aqueous electrolyte solution (C-3) was prepared by adding 1 g of 1,4-dicyanobutene and 2 g of vinylene carbonate, as an additive, to 97 g of the electrolyte solution (A-4).

Then, a pouch type lithium secondary battery was prepared in the same manner as in Comparative Example 1 except injecting the non-aqueous electrolyte solution (C-3) instead of the non-aqueous electrolyte solution (C-1) of Comparative Example 1.

Comparative Example 4

A non-aqueous electrolyte solution (C-4) was prepared in the same manner as in Example 1 except that adiponitrile represented by the following Formula 2 was included as an additive, instead of 1,4-dicyanobutene.

Then, a pouch type lithium secondary battery was prepared in the same manner as in Example 1 except injecting the non-aqueous electrolyte solution (C-4) instead of the non-aqueous electrolyte solution (B-1) of Example 1.

[Formula 2]

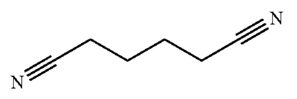

Comparative Example 5

(Non-Aqueous Electrolyte Solution Preparation)

An electrolyte solution (A-5) was prepared by mixing ethylene carbonate and ethyl propionate in a volume ratio of 3:7 and then dissolving $LiPF_6$ such that a concentration of the $LiPF_6$ was 1.6 M. A non-aqueous electrolyte solution (C-5) was prepared by adding 1 g of 1,4-dicyanobutene and 2 g of vinylene carbonate, as an additive, to 97 g of the electrolyte solution (A-5).

Then, a pouch type lithium secondary battery was prepared in the same manner as in Comparative Example 1 except injecting the non-aqueous electrolyte solution (C-5) instead of the non-aqueous electrolyte solution (C-1) of Comparative Example 1.

Comparative Example 6

An electrolyte solution (A-6) was prepared by mixing ethylene carbonate and ethyl propionate in a volume ratio of 2:8 and then dissolving $LiPF_6$ such that a concentration of the $LiPF_6$ was 1.6 M. A non-aqueous electrolyte solution (C-6) was prepared by adding 1 g of 1,4-dicyanobutene and 2 g of vinylene carbonate, as an additive, to 97 g of the electrolyte solution (A-6).

Then, a pouch type lithium secondary battery was prepared in the same manner as in Comparative Example 1 except injecting the non-aqueous electrolyte solution (C-6) instead of the non-aqueous electrolyte solution (C-1) of Comparative Example 1.

Comparative Example 7

An electrolyte solution (A-7) was prepared by mixing ethylene carbonate (EC), ethyl methyl carbonate (EMC), and ethyl propionate (EP) in a volume ratio of 2:4:4 and then dissolving $LiPF_6$ such that a concentration of the $LiPF_6$ was 1.6 M. A non-aqueous electrolyte solution (C-7) was prepared by adding 1 g of 1,4-dicyanobutene and 2 g of vinylene carbonate, as an additive, to 97 g of the electrolyte solution (A-7).

Then, a pouch type lithium secondary battery was prepared in the same manner as in Comparative Example 1 except injecting the non-aqueous electrolyte solution (C-7) instead of the non-aqueous electrolyte solution (C-1) of Comparative Example 1.

TABLE 1

| | Electrolyte solution | | Amount of first additive (g) | | Amount of second additive (g) |
|---|---|---|---|---|---|
| | Composition | Amount (g) | 1,4-DCB | Adn | VC |
| Example 1 | Electrolyte solution (A-1) | 97 | 1 | — | 2 |
| Example 2 | Electrolyte solution (A-1) | 95 | 3 | — | 2 |
| Example 3 | Electrolyte solution (A-1) | 97.5 | 0.5 | — | 2 |
| Example 4 | Electrolyte solution (A-2) | 97 | 1 | — | 2 |
| Example 5 | Electrolyte solution (A-1) | 93 | 5 | — | 2 |
| Example 6 | Electrolyte solution (A-1) | 92 | 6 | — | 2 |
| Comparative Example 1 | Electrolyte solution (A-1) | 98 | — | — | 2 |
| Comparative Example 2 | Electrolyte solution (A-3) | 97 | 1 | — | 2 |
| Comparative Example 3 | Electrolyte solution (A-4) | 97 | 1 | — | 2 |
| Comparative Example 4 | Electrolyte solution (A-1) | 97 | — | 1 | 2 |
| Comparative Example 5 | Electrolyte solution (A-5) | 97 | 1 | — | 2 |
| Comparative Example 6 | Electrolyte solution (A-6) | 97 | 1 | — | 2 |
| Comparative Example 7 | Electrolyte solution (A-7) | 97 | 1 | — | 2 |

In Table 1, each abbreviation is as follows.

Electrolyte solution (A-1): 1.6 M $LiPF_6$/ethylene carbonate (EC):ethyl propionate (EP)=1:9 volume ratio Electrolyte solution (A-2): 1.6 M $LiPF_6$/EC:EP=1.5:8.5 volume ratio Electrolyte solution (A-3): 1.0 M $LiPF_6$/EC:EP=1:9 volume ratio Electrolyte solution (A-4): 1.6 M $LiPF_6$/EC:propyl propionate (PP)=1:9 volume ratio Electrolyte solution (A-5): 1.6 M $LiPF_6$/EC:EP=3:7 volume ratio Electrolyte solution (A-6): 1.6 M $LiPF_6$/EC:EP=2:8 volume ratio Electrolyte solution (A-7): 1.6 M $LiPF_6$/EC:ethyl methyl carbonate (EMC):EP=2:4:4 volume ratio 1,4-DCB: 1,4-dicyanobutene VC: vinylene carbonate Adn: adiponitrile

EXPERIMENTAL EXAMPLES

Experimental Example 1. Cycle Capacity Retention Evaluation Test

That the lithium secondary batteries prepared in Examples 1 to 4 and 6 and the lithium secondary batteries prepared in Comparative Examples 1 to 4 and 7 were charged at a constant current of 2 C rate to 4.45 V at room temperature (25° C.), were charged at a constant voltage of 4.45 V to terminate the charging when the charging current reached 110.5 mA, and were then discharged at a constant current of 0.5 C rate to 3.0 V was set as one cycle, and 200 cycles of the charging and discharging were performed. After the charging and discharging were completed, a rest time of 10 minutes was applied. In this case, discharge capacity after one cycle and discharge capacity after 200 cycles at room temperature (25° C.) were measured using PNE-0506 charge/discharge equipment (manufacturer: PNE SOLUTION Co., Ltd., 5 V, 6 A), and capacity retentions (%) after 200 cycles calculated are then presented in Table 2 below.

TABLE 2

| | Capacity retention after 2 C charge/200 cycles (%) |
|---|---|
| Example 1 | 96.2 |
| Example 2 | 94.3 |
| Example 3 | 96.8 |
| Example 4 | 96.0 |
| Example 6 | 91.4 |
| Comparative Example 1 | 93.8 |
| Comparative Example 2 | 92.1 |
| Comparative Example 3 | 90.5 |
| Comparative Example 4 | 93.4 |
| Comparative Example 7 | 90.6 |

As illustrated in Table 2, the lithium secondary batteries prepared in Examples 1 to 4, which included the non-aqueous electrolyte solution of the present invention, had a capacity retention after 200 cycles of about 94.3% or more, wherein it may be understood that the capacity retentions were improved in comparison to those of the lithium secondary batteries prepared in Comparative Examples 1 to 4 and 7.

That is, with respect to the secondary battery of Comparative Example 2, since concentrations of the ethylene carbonate and the lithium salt were low, decompositions of the lithium salt and the solvent at high temperatures were minimized to improve high-temperature stability, but it may be understood that the capacity retention was relatively reduced.

Also, with respect to the lithium secondary battery of Comparative Example 3 using propyl propionate instead of ethyl propionate, since wetting properties were deteriorated due to an increase in viscosity, it may be understood that battery performance was poor.

With respect to the lithium secondary battery of Example 6 which included the non-aqueous electrolyte solution including an excessive amount of the nitrile-based additive, since the dissolution of the transition metal from the positive electrode may be suppressed, but an excessively thick film was formed on the positive/negative electrode to increase resistance after the charging at 2 C rate, it may be understood that the capacity retention (%) after 200 cycles was relatively reduced in comparison to the secondary battery of Comparative Example 1 which included the non-aqueous electrolyte solution without including the nitrile-based additive, the secondary battery of Comparative Example 2 including a low concentration of the lithium salt, and the lithium secondary battery prepared in Comparative Example 4 which included the non-aqueous electrolyte solution including adiponitrile.

Experimental Example 2. Evaluation of Thickness Change Rate During High-Temperature Storage After the lithium secondary batteries prepared in Examples 1 to 6 and the lithium secondary batteries prepared in Comparative Examples 1 to 7 each were charged at a constant current of 0.7 C rate to 4.45 V and were charged at a constant voltage of 4.45 V to terminate the charging when the charging current reached 110.5 mA, an initial thickness value before high-temperature storage of each lithium secondary battery was measured using a plate thickness gauge (Mitutoyo, ID-C125XB) with a weight of 300 g.

Then, after each lithium secondary battery was stored at a high temperature of 85° C. for 8 hours, a volume increase rate (thickness change rate) of the lithium secondary battery, which was increased after the high-temperature storage with respect to the initial thickness, was measured using the plate thickness gauge (Mitutoyo, ID-C125XB) with a weight of 300 g, and a degree of thickness change measured was calculated as a percentage (%) and presented in Table 3 below.

TABLE 3

| | Volume increase rate after storage at 85° C. for 8 hours (%) |
|---|---|
| Example 1 | 2.6 |
| Example 2 | 2.8 |
| Example 3 | 3.9 |
| Example 4 | 4.0 |
| Example 5 | 3.1 |
| Example 6 | 3.4 |
| Comparative Example 1 | 24.7 |
| Comparative Example 2 | 4.8 |
| Comparative Example 3 | 4.5 |
| Comparative Example 4 | 20.5 |
| Comparative Example 5 | 16.4 |
| Comparative Example 6 | 6.6 |
| Comparative Example 7 | 32.9 |

As illustrated in Table 3, with respect to the lithium secondary batteries prepared in Examples 1 to 6 which included the non-aqueous electrolyte solution of the present invention, volume increase rates after high-temperature storage were 4.0% or less, wherein it may be understood that the volume increase rates after high-temperature storage were improved in comparison to those of the lithium secondary batteries prepared in Comparative Examples 1 to 7.

Experimental Example 3. Capacity Retention after High-Temperature Storage Evaluation Test After each of the lithium secondary batteries prepared in Examples 1 to 5 and the lithium secondary batteries prepared in Comparative Examples 1 to 7 was charged at 0.7 C rate to 4.45 V under a constant current condition and was charged at a constant voltage of 4.45 V to terminate the charging when the charging current reached 110.5 mA, each lithium secondary battery was stored at a high temperature of 85° C. for 8 hours.

Then, discharge capacity was measured while each lithium secondary battery was discharged at 0.2 C to 3.0 V at room temperature, and capacity retention after high-temperature storage relative to 2,210 mAh, theoretical capacity of the corresponding cell, was measured and presented in Table 4 below. The discharge capacity was measured using PNE-0506 charge/discharge equipment (manufacturer: PNE SOLUTION Co., Ltd., 5 V, 6 A).

TABLE 4

| | Capacity retention after storage at 85° C. for 8 hours (%) |
|---|---|
| Example 1 | 95.0 |
| Example 2 | 93.8 |
| Example 3 | 94.2 |
| Example 4 | 94.3 |
| Example 5 | 92.6 |
| Comparative Example 1 | 84.6 |
| Comparative Example 2 | 92.4 |
| Comparative Example 3 | 87.3 |
| Comparative Example 4 | 91.6 |
| Comparative Example 5 | 88.1 |
| Comparative Example 6 | 93.0 |
| Comparative Example 7 | 90.2 |

Referring to Table 4, with respect to the lithium secondary batteries prepared in Examples 1 to 4 including the non-aqueous electrolyte solution of the present invention, capacity retentions after high-temperature storage were 93.8% or more, wherein it may be understood that the capacity retentions were improved in comparison to those of Comparative Examples 1 to 7.

Particularly, with respect to the secondary batteries of Example 1, which included the non-aqueous electrolyte solution including ethylene carbonate in a volume ratio of 1.0, and Example 4 which included the non-aqueous electrolyte solution including ethylene carbonate in a volume ratio of 1.5, since a side reaction was reduced as the amount of the ethylene carbonate, which was easy to generate gas at high temperatures, was relatively decreased, it may be understood that the capacity retentions after high-temperature storage were significantly improved in comparison to those of the secondary batteries of Comparative Example 5, which included the non-aqueous electrolyte solution containing ethylene carbonate and ethyl propionate in a volume ratio of 3:7, and Comparative Example 6 which included the non-aqueous electrolyte solution containing ethylene carbonate and ethyl propionate in a volume ratio of 2:8.

With respect to the secondary battery of Comparative Example 3 which included the non-aqueous electrolyte solution containing propyl propionate instead of ethyl propionate, since a disadvantage occurs in achieving capacity due to a decrease in permittivity, a decrease in ionic conductivity, and an increase in viscosity, it may be understood that the capacity retention after high-temperature storage was reduced in comparison to those of the secondary batteries of Examples 1 and 4 containing ethylene carbonate and ethyl propionate as a non-aqueous solvent.

With respect to the lithium secondary battery of Example 5 in which the amount of the nitrile-based additive was 5 wt %, since resistance was increased while a film, which was relatively thicker than that of the lithium secondary battery of Comparative Example 6 in which the amount of the nitrile-based additive was relatively low, was formed on the positive/negative electrode, it may be understood that the capacity retention (%) after high-temperature storage was relatively reduced.

Experimental Example 4. Rapid Charging Evaluation Test

After a charging range was determined from a state of charge (SOC) of 0% to a SOC of 100% for the lithium secondary batteries prepared in Examples 1 and 4 and the lithium secondary batteries prepared in Comparative Examples 4 to 7, charge and discharge were performed in such a manner that a first cycle was performed at a current rate of 0.1 C, a second cycle was performed at a current rate of 0.2 C, a third cycle was performed at a current rate of 1.0 C, and a fourth cycle was performed at a current rate of 2.0 C, rapid charging efficiency of the battery was then calculated using the following Equation 1, and the results thereof are represented in Table 5 below.

Rapid charging efficiency (%)=[2.00 current discharge capacity/0.2C current discharge capacity]×100 [Equation 1]

TABLE 5

| | Rapid charging efficiency (%) |
|---|---|
| Example 1 | 92.7 |
| Example 4 | 92.2 |
| Comparative Example 4 | 91.1 |
| Comparative Example 5 | 88.6 |
| Comparative Example 6 | 90.1 |
| Comparative Example 7 | 88.9 |

Referring to Table 5, since the secondary batteries of Examples 1 and 4 of the present invention may secure high ionic conductivity and an appropriate viscosity level through an appropriate solvent configuration with a lithium salt having a specific concentration in comparison to the secondary batteries of Comparative Examples 4 to 7, it may be understood that rapid charging efficiency may be improved by minimizing resistance of the film formed by the additive.

Particularly, since viscosity of the non-aqueous electrolyte solution increases when EC was included in an amount of 20 vol % or more in the non-aqueous electrolyte solution as in the non-aqueous electrolyte solutions of Comparative Examples 5 and 6, it was difficult to secure physical properties while the viscosity of the non-aqueous electrolyte was excessively increased when the lithium salt having a specific concentration was used together, and thus, rapid charging performance was degraded. Also, in a case in which a linear carbonate solvent, such as ethyl methyl carbonate, was added as in the non-aqueous electrolyte solution of Comparative Example 7, since it became unsuitable for a lithium salt system with a specific concentration while the viscosity level also increased, rapid charging performance became poor.

Furthermore, if adiponitrile is used as an example of the nitrile-based additive as in the non-aqueous electrolyte solution of Comparative Example 4, since a power of suppressing resistance increase due to the side reaction at an interface of the positive electrode was reduced in comparison to that of 1,4-dicyanobutene, the rapid charging performance became poor.

The invention claimed is:

1. A lithium secondary battery, comprising a positive electrode; a negative electrode; a non-aqueous electrolyte solution; and a separator, wherein the negative electrode comprises a negative electrode active material, wherein the negative electrode active material is a carbon material, and wherein the non-aqueous electrolyte solution comprises:

a lithium salt present at a concentration of 1.6 M to 2.0 M, an organic solvent consisting of ethylene carbonate and ethyl propionate, and a first additive represented by Formula 1 in an amount of 0.5 wt % to 3 wt % based on a total weight of the non-aqueous electrolyte solution, wherein the ethylene carbonate and the ethyl propionate are included in a volume ratio of 1:9 to 1.5:8.5,

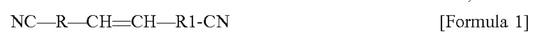
NC—R—CH═CH—R1-CN [Formula 1]

wherein, in Formula 1,

R and R1 are each independently a substituted or unsubstituted alkylene group having 1 or 2 carbon atoms.

2. The lithium secondary battery of claim 1, wherein the first additive is 1,4-dicyanobutene.

3. The lithium secondary battery of claim 1, wherein the non-aqueous electrolyte solution further comprises a second additive, wherein the second additive is at least one selected from the group consisting of a phosphate-based compound, a sulfite-based compound, a sulfone-based compound, a sulfate-based compound, a sultone-based compound, a halogen-substituted carbonate-based compound, a nitrile-based compound excluding the first additive, a borate-based compound, and a lithium salt-based compound.

4. The lithium secondary battery of claim 3, wherein the second additive is at least one selected from the group consisting of vinylene carbonate, vinylethylene carbonate, 1,3-propane sultone, fluoroethylene carbonate, hexane tricyanide, and lithium oxalyldifluoroborate.

5. The lithium secondary battery of claim 1, wherein the non-aqueous electrolyte solution does not include a phosphate-based compound.

* * * * *